United States Patent Office 3,489,713
Patented Jan. 13, 1970

3,489,713
PROCESS FOR COLORING LINEAR POLYESTERS WITH A DYESTUFF WHICH IS FREE FROM SULPHONIC ACID GROUPS
Francis Bowman, Albert Charles Cooper, Francis Irving, Alistair Livingston, David Frederick White, and Donald Graham Wilkinson, Manchester, England, assignors to Imperial Chemical Industries Limited, Millbank, London, England, a corporation of Great Britain
No Drawing. Filed Feb. 6, 1967, Ser. No. 614,050
Claims priority, application Great Britain, Feb. 17, 1966, 7,027/66; May 2, 1966, 19,210/66
Int. Cl. C08g 53/04; C08j 1/08
U.S. Cl. 260—40        5 Claims

ABSTRACT OF THE DISCLOSURE

A process for the mass coloration of synthetic linear polyesters which comprises using as coloring matter at least one dystuff of the formula

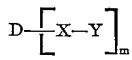

wherein D is a dyestuff radical which is free from sulphonic acid groups and which is selected from the class consisting of benzanthrone, 3′:4′-phthaloylacridone, triphendioxazine, 1′:9′-anthrapyridone, dibenzanthrone, isothiazoloanthrone and bis imides of naphthalene-1:4:5:8-tetracarboxylic acid dyestuff radicals, and wherein the —X—Y group is attached to an atom selected from the class consisting of carbon and nitrogen atoms forming part of one of the condensed rings making up the polycyclic dyestuff radical D; X is selected from the class consisting of a direct link, —O—, —S—,

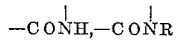

and —COO—; R is selected from the class consisting of lower alkyl having 1–4 carbon atoms and hydroxy lower alkyl having 1–4 carbon atoms; Y is selected from the class consisting of hydroxy lower alkyl having 1–4 carbon atoms and hydroxy lower alkoxy lower alkyl wherein each of said alkoxy and alkyl moieties has 1–4 carbon atoms; and m is a positive integer not exceeding 3.

---

This invention relates to a coloration process and more particularly to a process for the mass coloration of synthetic linear polyesters, particularly polyethylene terephthalate.

In order for a coloring matter to be completely satisfactory for use in the mass coloration of synthetic linear polyesters it must fulfil the following requirements:

(1) It must be capable of withstanding the high temperature of the molten material (approximately 290° C.).

(2) It must not have a high volatility, otherwise it may sublime during the spinning process, causing irregular coloration and fabrics subsequently subjected to pleating operations may lose colour strength or cause marking of adjacent fabric.

(3) It must have high fastness to light, and to the action of dry cleaning solvents, perspiration and bleaches.

It has now been found that a class of polycylic dyestuff compounds is particularly valuable for the mass coloration of synthetic linear polyesters.

According to the invention there is provided a process for the mass coloration of synthetic linear polyesters which comprises using as colouring matter one or more dyestuffs of the formula:—

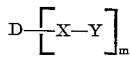

wherein D represents a polycyclic dyestuffs radical which contains at least four condensed rings and which is free from sulphonic acid groups;

X represents a direct link or —O—, —S—,
—CONH—

or —COO—;

R represents a lower alkyl or hydroxy lower alkyl radical;

Y represents a hydroxy lower alkyl or hydroxy lower alkoxy lower alkyl radical;

And m is an integer of from 1 to 3.

As examples of the radicals represented by R there may be mentioned methyl, ethyl, propyl, butyl, β-hydroxyethyl and β- or γ-hydroxypropyl radicals.

As examples of the radicals represented by Y there may be mentioned hydroxy lower alkyl radicals such as β-hydroxyethyl, β- or γ-hydroxypropyl, β:γ-dihydroxypropyl and β-, γ- or δ-hydroxybutyl radicals, and hydroxy lower alkoxy lower alkyl radicals such as β-(β′-hydroxyethoxy)ethyl and β- or γ-(β′-hydroxyethoxy)propyl radicals.

Each of the —X—Y groups is attached to a carbon or a nitrogen atom present in the condensed rings making up the polycyclic dyestuff radical D. The polycyclic dyestuff radical represented by D is the radical of any polycylic ring system which is normally present in such dyestuffs and which contains at least 4 condensed rings, but the said dyestuff radicals preferably contain from 4 to 9 condensed rings, which can be carbocyclic, preferably benzene rings, or heterocyclic rings or a combination of both types. If desired the said dyestuff radicals can contain further substituents, other than sulphonic acid groups, which are commonly present in such dyestuff radicals, for example chlorine or bromine atoms, lower alkyl radicals such as the methyl radical, lower alkoxy radicals such as the methoxy radical, hydroxy groups, amino groups, N-lower alkylamino groups such as methylamino, ethylamino, dimethylamino and diethylamino groups, and acylamino groups such as acylamino groups derived from lower aliphatic carboxylic acids such as acetylamino and propionylamino groups, or from monocyclic aryl carboxylic acids such as the benzoylamino group. It is however preferred that D represents a benzanthrone, 1′:9′-anthrapyridone, 1′:9′-anthrapyrimidine, isothiazoloanbenzanthrone, isodibenzanthrone, triphendioxazine or bisimide of naphthalene-1:4:5:8-tetracarboxylic acid dyestuff radical.

Throughout the specification the terms "lower alkyl" and "lower alkoxy" are used to denote alkyl and alkoxy radicals respectively containing from 1 to 4 carbon atoms.

The process of the invention can be conveniently carried out by incorporating one or more of the said dyestuffs into the synthetic linear polyesters by any of the known techniques for mass coloration of such materials. Thus the dyestuffs in finely divided form may be coated onto chips of the polyester by tumbling and the resulting coloured mixture subsequently melted and spun into filaments or shaped into solid objects. If desired, tumbling may be carried out with a dispersion of the dyestuff in a volatile liquid, e.g. water or alcohol, or such a liquid may be used to moisten the mixture of dyestuff and polymer during the stage of tumbling. The volatile liquid is preferably removed by evaporation before melting.

The process of the invention can also be carried out by heating a mixture of the polymer forming components, such as terephthalic acid or dimethylterephthalate and a glycol such as ethylene glycol, containing one or more of the said dyestuffs, until polymerisation is complete. The coloured polymer so formed can then be shaped into articles or spun into fibres by known techniques. Alternatively the polymer forming components can be heated together to form a low-molecular weight polymer, the dyestuff is then added and heating continued until the required degree of polymerisation is obtained.

As examples of synthetic linear polyesters which can be coloured by the process of the invention there may be mentioned polyesters which are obtained by the reaction of terephthalic acid or an ester thereof with glycols of the formula HO—$(CH_2)_x$—OH wherein $x$ is an integer of from 2 to 10, or with 1:4-di(hydroxymethyl)cyclohexane. The term synthetic linear polyesters also includes copolyesters based on the said polyesters; such copolyesters being obtained by replacing a portion of the terephthalic acid by another dicarboxylic acid or by a hydroxycarboxylic acid, and/or replacing a portion of the glycol by a different glycol.

A preferred class of dyestuffs for use in the process of the invention comprises the dyestuffs of the formula:

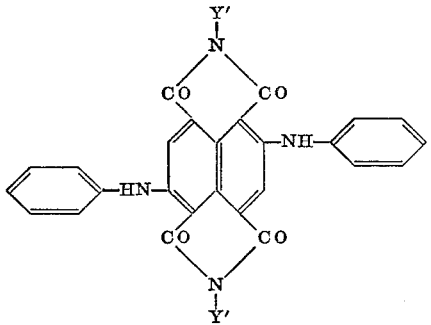

wherein Y′ is a hydroxy lower alkyl radical, and the benzene rings may be substituted by chlorine or bromine atoms or lower alkyl or lower alkoxy radicals.

The dyestuffs used in the process of the invention can be obtained by the methods which are commonly employed for introducing —X—Y groups into polycyclic dyestuffs. Thus the dyestuffs wherein X is —O— or —S— can be obtained by reacting the sodium salts of the corresponding dyestuffs containing hydroxy or mercapto groups with the appropriate halogenoalkanol. The bis-imides of naphthalene-1:4:5:8-tetracarboxylic acid can be obtained by reacting the anhydride of an optionally substituted naphthalene-1:4:5:8-tetracarboxylic acid with the appropriate aminoalkanol. The dyestuffs wherein X represents —COO— can be obtained by reacting the sodium salt of the corresponding dyestuff containing a carboxylic acid group with a chloroalkanol of the formula Cl—Y. The dyestuffs wherein X represents

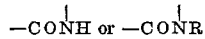

can be obtained by treating with thionyl chloride the corresponding dyestuff containing a carboxylic acid group, and reacting the resulting acid chloride with the appropriate amine of the formula H₂NY or

The colorations produced by the process of the invention have good fastness to washing, pressure steaming, acid cross dyeing, perspiration, dry cleaning, rubbing after steaming, dry heat treatments such as are used in pleating operations, and to light. It is also found that the colorations can be produced in heavy depths of shade, without impairing the properties of the synthetic linear polyesters or fibres derived therefrom.

The invention is illustrated but not limited by the following examples in which the parts are by weight.

EXAMPLE 1

1 part of 3-(β-hydroxyethoxy)benzathrone in powder form is tumbled with 100 parts of polyethylene terephthalate in the form of chips. The resulting mixture is then melt spun in known manner to produce fibres of a bright greenish-yellow colour and excellent fastness properties.

EXAMPLE 2

1 part of 10-(β-hydroxyethoxy)-3′:4′-phthaloylacridone and 3 parts of β-ethoxyethanol are tumbled with 100 parts of polyethylene terephthalate in the form of small granules until a uniform mixture results. The coloured mixture is dried at 120° C. in a vacuum, and then melt spun to give fibres of a deep reddish-violet shade and excellent fastness properties.

The 10-(β-hydroxyethoxy) - 3′:4′ - phthaloylacridone used in this example was obtained by heating 1-[p-(β-hydroxyethoxy)anilino]anthraquinone-2-carboxylic acid with benzoyl chloride in o-dichlorobenzene.

EXAMPLE 3

1 part of the triphendioxazine pigment containing two β-hydroxyethyl groups (which was obtained as described below) in finely divided form is tumbled with 100 parts of polyethylene terephthalate in the form of granules until a uniform mixture is obtained. The mixture is then melt spun in known manner to give fibres of a deep violet shade possessing excellent fastness properties.

The triphendioxazine dyestuff used in this example was obtained by condensing two molecular proportions of 3-amino-9(N)-β-hydroxyethylcarbazole with one molecular proportion of chloranil and cyclising the resulting product by heating it with anhydrous ferric chloride in nitrobenzene.

EXAMPLE 4

1 part of 6-anilino-3-(β-hydroxyethyl)-1′:9′-anthrapyridone and 3 parts of β-ethoxyethanol are tumbled with 100 parts of polyethylene terephthalate in the form of small granules until a uniform mixture results. The coloured mixture is dried at 120° C. in a vacuum, and is then melt spun to give fibres of a crimson shade and excellent fastness properties.

The 6-anilino-3-(β-hydroxyethyl)-1′:9′-anthrapyridone used in this example was obtained by acetylating and then cyclising 4-bromo-1-(β-hydroxyethylamino)-anthraquinone to give 6-bromo-3-(β-hydroxyethyl)-1′:9′-anthrapyridone which was then reacted with aniline.

In place of the 6-anilino-3-(β-hydroxyethyl)-1′:9′-anthrapyridone used in the above example, there is used 1 part of the bis(β-hydroxyethyl)imide of 2:6-dianilinonaphthalene-1:4:5:8-tetracarboxylic acid, whereby the resulting fibres of polyethylene terephthalate are coloured in fast brilliant blue shades. The bis(β-hydroxyethyl)imide of 2:6-dianilinonaphthalene-1:4:5:8-tetracarboxylic acid was prepared by reacting 2:6-dichloronaphthalene-1:4:5:8-tetracarboxylic acid anhydride with β-hydroxyethylamine in glacial acetic acid and reacting the resulting product with aniline to convert each of the chlorine atoms to an anilino group.

EXAMPLE 5

In place of the dyestuffs used in Example 4 there is used 1 part of 16-(β:γ-dihydroxypropoxy)-17-hydroxydibenzanthrone or 1 part of 16:17-di(β:γ-dihydroxypropoxy)dibenzanthrone whereby reddish-blue and greenish-blue fibres respectively are obtained, which possess excellent fastness properties.

The dyestuffs used in this example were obtained by the method described in German patent specification 761,553 and the resulting mixture separated into the two components by fractional crystallisation from o-dichlorobenzene.

EXAMPLE 6

100 parts of dimethylterephthalate, 71 parts of ethylene glycol and 0.05 part of manganese acetate are stirred together for 4 hours at 197° C., during which time about 33 parts of methanol distil off from the mixture. To the resulting mixture is added 0.04 part of phosphorus acid, 0.04 part of antimony trioxide and 1 part of the bis(β- hydroxyethylimide) of 2:6-dianilinonaphthalene-1:4:5:8-tetracarboxylic acid, which had been previously milled for 30 minutes in the presence of 4 parts of ethylene glycol. The temperature of the mixture is then increased to 270° C., the pressure is reduced to 0.3 mm. of mercury, and the mixture is stirred under these conditions for 6 hours whilst the excess ethylene glycol distils off. The molten polymer is then discharged from the reaction vessel and cut into chip form, which is subsequently remelted and spun to give brilliant blue fibres of excellent fastness properties.

In place of the dyestuff used in this example there are used any of the following dyestuffs whereby similar results are obtained:

bis(β-hydroxyethylimide) of 2:6-di(o-, m- or p-toluidino)-naphthalene-1:4:5:8-tetracarboxylic acid, bis(β-hydroxyethylimide) of 2:6-di[o-, m- or p-(chloro- or bromo)anilino]naphthalene-1:4:5:8-tetracarboxylic acid, bis(β- or γ-hydroxypropylimide) of 2:6-di(o-, m- or p-methoxyanilino)naphthalene - 1:4:5:8 - tetracarboxylic acid, bis(γ-hydroxy-n-butylimide) of 2:6-dianilinonaphthalene-1:4:5:8-tetracarboxylic acid, and bis[β-(β'-hydroxyethoxy)ethylimide] of 2:6-dianilino-naphthalene-1:4:5:8-tetracarboxylic acid.

These dyestuffs were obtained by condensing 2:6-dichloronaphthalene-1:4:5:8-tetracarboxylic acid anhydride with the appropriate hydroxyalkylamine in acetic acid, and then reacting the resulting bis(imide) with an excess of the appropriately substituted aniline.

EXAMPLE 7

1 part of the bis(β-hydroxyethylimide) of 2:6-dianilinonaphthalene-1:4:5:8-tetracarboxylic acid in finely divided form is tumbled with 100 parts of small granules of the polyester obtained from ethylene glycol and α:β-bis(4-carboxyphenoxy)ethane, and the resulting mixture is melted and spun to give brilliant blue fibres of excellent fastness properties.

EXAMPLE 8

1 part of 3-(β-hydroxyethylmercapto)benzanthrone in finely divided form is tumbled with 100 parts of polyethylene terephthalate in the form of chips. The resulting mixture is then melted and spun to give fibres of a bright greenish-yellow shade having excellent fastness properties.

The above dyestuff was obtained by heating an aqueous solution of the sodium salt of 3-mercaptobenzanthrone with ethylene chlorohydrin in the presence of sodium carbonate at 80° C.

EXAMPLE 9

In place of the 1 part of the dyestuff used in Example 8 there is used 1 part of the β-hydroxyethyl ester of isothiazoloanthrone-3-carboxylic acid or 1 part of isothiazoloanthrone-3-carbo-N-methyl-N-(β-hydroxyethyl)amide or 1 part of isothiazoloanthrone-3-carbo-N-(β-hydroxyethyl)amide or 1 part of isothiazoloanthrone-3-carbo-N:N-di(β-hydroxyethyl)amide whereby bright yellow fibres of excellent fastness properties were obtained.

The first dyestuff used in this example was obtained by heating the sodium salt of isothiazoloanthrone-3-carboxylic acid with ethylene chlorohydrin, while the other dyestuffs were obtained by heating isothiazoloanthrone-3-carboxylic acid with thionyl chloride and reacting the resulting acid chloride with N-methyl-N-(β-hydroxyethyl)amine, β-hydroxyethylamine or di(β-hydroxyethyl)amine respectively.

We claim:
1. Process for the mass coloration of synthetic linear polyesters which comprises using as colouring matter at least one dyestuff of the formula:

D[X—Y]$_m$ wherein D is a dyestuff radical which is free from sulphonic acid groups and which is selected from the class consisting of benzanthrone, 3':4'-phthaloylacridone, triphendioxazine, 1':9'-anthrapyridone, dibenzanthrone, isothiazoloanthrone and bis imides of naphthalene-1:4:5:8-tetracarboxylic acid dyestuff radicals, and wherein the —X—Y group is attached to an atom selected from the class consisting of carbon and nitrogen atoms forming part of one of the condensed rings making up the polycyclic dyestuff radical D;

X is selected from the class consisting of a direct link, —O—, —S—,

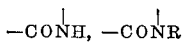

and —COO—;

R is selected from the class consisting of lower alkyl having 1–4 carbon atoms and hydroxy lower alkyl having 1–4 carbon atoms;

Y is selected from the class consisting of hydroxy lower alkyl having 1–4 carbon atoms and hydroxy lower alkoxy lower alkyl wherein each of the alkoxy and alkyl moieties has 1–4 carbon atoms;

and $m$ is a positive integer not exceeding 3.

2. Process as claimed in claim 1 wherein the dyestuff is mixed with the polyester and the resultant mixture is melted and spun into fibres.

3. Process as claimed in claim 1 wherein the dyestuff is mixed with the polyester-forming components and the mixture is polymerised.

4. Process as claimed in claim 1 wherein the polyester is a polyethylene terephthalate.

5. Process as claimed in claim 1 wherein the dyestuff is a dyestuff of the formula:

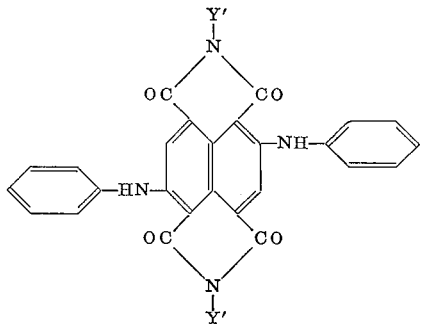

wherein Y' is a hydroxy lower alkyl radical having 1–4 carbon atoms, and any substituents on the benzene rings are selected from the class consisting of chlorine, bromine, lower alkyl having 1–4 carbon atoms and lower alkoxy having 1–4 carbon atoms.

References Cited

UNITED STATES PATENTS

| | | | |
|---|---|---|---|
| 3,336,312 | 8/1967 | Braun et al. | 260—40 |
| 3,187,021 | 6/1965 | Weber | 260—303 |
| 3,047,577 | 7/1962 | Schwechten et al. | 260—357 |

MORRIS LIEBMAN, Primary Examiner

SANDRA M. PERSON, Assistant Examiner

U.S. Cl. X.R.

8—39; 260—355